Patented Feb. 12, 1946

2,394,898

UNITED STATES PATENT OFFICE 2,394,898

ISOMERIZING HYDROCARBONS

Harry A. Cheney and Frank M. McMillan, Berkeley, Calif., assignors to Shell Development Company, San Francisco, Calif., a corporation of Delaware No Drawing. Application January 30, 1942, Serial No. 428,862

9 Claims. (Cl. 260—683.5)

The present invention relates to the isomerization of saturated hydrocarbons, and relates more particularly to an improved process for the catalytic conversion of normal or branched chain saturated hydrocarbons to branched and more highly branched chain saturated hydrocarbons. A more particular aspect of the invention relates to the conversion of normal or branched chain paraffins having at least five carbon atoms to the molecule to branched or more highly branched chain paraffins.

The aluminum halides are known to be effective catalysts for the isomerization of hydrocarbons. Of the aluminum halides, the chloride is generally preferred because of its availability and relatively lower cost. The use of aluminum chloride per se, however, even in the presence of a hydrogen halide promoter possesses distinct disadvantages. At higher temperatures the catalyst tends to cause degradation reactions which lead to the formation of by-products which, even when formed in relatively small amounts, coat the catalyst particles, thereby preventing effective contact of catalyst and hydrocarbon and causing the catalyst to agglomerate into a sticky mass. Supported aluminum chloride catalysts, although superior to aluminum chloride per se, have certain disadvantages. Thus the available degree of contact between reactants and catalyst is generally insufficient to enable efficient operation in the liquid phase. This is particularly important in view of the fact that the isomerization of saturated hydrocarbons having more than four carbon atoms to the molecule is generally effected more advantageously in the liquid phase. A further disadvantage often inherent in the use of solid catalysts resides in the difficulty of efficiently controlling the catalyst bed temperature, due to the poor heat conductivity of most of the available solid isomerization catalysts. A considerable portion of these catalysts often consists of inert support material, thereby requiring the use of large reaction zones for relatively small amounts of the active catalyst constituent.

The use of aluminum chloride per se in the molten state is entirely unsatisfactory because of its high melting point and relatively high volatility. Modified aluminum chloride catalysts, such as the purely double salts of aluminum chloride, are also unsatisfactory because they usually possess but little if any ability to catalyze hydrocarbon isomerization and generally melt at too high a temperature. The sludge type catalysts, such as organic aluminum chloride complexes, have a relatively limited field of application and their use generally entails serious difficulties in the handling of these materials within the system. It is therefore readily apparent that a process employing a purely inorganic liquid catalyst which is not only effective in its ability to catalyze hydrocarbon isomerization, but which maintains its fluidity and activity at temperatures sufficiently low to permit its use for the treatment of the more readily degraded hydrocarbons, such as pentane, in the absence of any substantial hydrocarbon decomposition is highly advantageous.

It is an object of the present invention to provide an improved process whereby saturated hydrocarbons can be isomerized more efficiently with the aid of a liquid inorganic catalyst.

A further object of the invention is the provision of an improved process whereby normal or branched chain saturated hydrocarbons having at least five carbon atoms to the molecule are converted more efficiently in the liquid phase to branched or more highly branched chain saturated hydrocarbons with the aid of a liquid inorganic catalyst at temperatures sufficiently low to avoid any substantial hydrocarbon decomposition. Other objects and advantages of the invention will become apparent from the following description thereof.

In accordance with the process of the invention, the saturated hydrocarbon to be isomerized is contacted under isomerizing conditions of temperature and pressure with a fluid melt consisting of a quaternary mixture comprising aluminum chloride, sodium chloride, potassium chloride and zinc chloride, wherein the aluminum chloride is present in molecular excess.

The proportions of the components in the quaternary catalyst melts employed in the process of the invention may vary within the scope of the invention in accordance with the particular characteristics of the catalyst desired, operating conditions, the nature of the hydrocarbons treated and the like. The degree of catalytic activity as well as other properties of the melts affecting their efficient use in the isomerization of a particular hydrocarbon is, however, dependent upon their composition. Thus it is essential that the aluminum chloride be present in molecular excess. A quaternary catalyst particularly effective for the isomerization of open chain paraffin hydrocarbons comprises the $AlCl_3$, $NaCl$, $KCl$ and $ZnCl_2$ in the approximate weight proportions of 75:7.5:7.5:10 (65; 15; 11.5; 8.5 mol per cent) respectively. These quaternary catalyst melts maintain not only their activity but also their fluidity at relatively low temperatures. Thus the quaternary eutectic comprising the components of the melts employed in the process of the invention has a melting point below about 45° C. The melt comprising the AlCl₃, NaCl, KCl and ZnCl₂ in the approximate weight proportions of 75:7.5:7.5:10, respectively, maintains its fluidity at temperatures below about 60° C. The saturated hydrocarbons having at least five carbon atoms to the molecule, particularly pentane, undergo substantial decomposition in the presence of most active aluminum chloride catalysts at even relatively moderately elevated temperatures. The process of the invention is therefore particularly well adapted to the advantageous treatment of these hydrocarbons. The ability of the quaternary catalyst melts to activate the isomerization of the saturated hydrocarbons having more than four carbon atoms to the molecule, such as, for example, pentane, and the degree to which these hydrocarbons are decomposed, even in the liquid phase, with increase in temperature in the presence of such active catalysts, is shown by the following example.

*Example I*

Normal pentane was treated in the liquid phase at 60° C., 70° C., 80° C. and 90° C. with a quaternary catalyst melt having a composition in weight per cent of AlCl₃—75%, NaCl—7.5%, KCl—7.5%, ZnCl₂—10%. The operations were carried out in the presence of hydrogen chloride at the following conditions:

Time of contact _____ minutes __ 30
HCl pressure _____ lbs. per sq. in __ 50
Catalyst charge _____ grams __ 210
Pentane charge _____ cc __ 650

Analyses of the products obtained are shown in mol per cent in the following table:

|  | Temperature | | | |
| --- | --- | --- | --- | --- |
|  | 60° C. | 70° C. | 80° C. | 90° C. |
| Isopentane | 20 | 29 | 66 | 13 |
| N-pentane | 76 | 68 | 22 | 9 |
| Decomposition products | 4 | 3 | 12 | 78 |

The rapid rate at which pentane decomposes in the presence of this catalyst with increase in temperature is readily apparent from the above results. The temperature of 80° C. is apparently near the critical temperature above which pentane decomposition is the predominating reaction. Thus in a series of experiments carried out at about 80° C. under substantially the conditions of Example I, the amounts of decomposition products obtained fluctuated between about 3 and 45 mol per cent of the total products, whereas at temperatures below 80° the amount of decomposition never exceeded 4%. Though the maximum temperature at which pentane can be isomerized in the absence of substantial pentane decomposition will vary with the nature of the particular catalyst used, it will in general not be substantially above 80° C. to 90° C. Since isomerization catalysts disclosed heretofore melt at temperatures substantially in excess of even 100° C., it is apparent that such catalysts are not satisfactory for the isomerization of pentane in the liquid phase.

It is seen from the above example that in the presence of the quaternary catalyst melts of the invention even the more readily degraded saturated hydrocarbons having at least five carbon atoms to the molecule can be isomerized efficiently in a relatively short contact time in the absence of any substantial hydrocarbon decomposition. By the term "decomposition" as used throughout this specification is meant the rupture of carbon to carbon and/or carbon to hydrogen bonds of the hydrocarbon molecule to result in the formation of hydrocarbons of lower molecular weight than the hydrocarbon treated. Increased catalyst life, due to the absence of any substantial hydrocarbon decomposition, and the possibility of attaining equilibrium mixtures containing higher proportions of iso-paraffins to normal paraffins at the lower temperatures, taken together with the ease with which the process can be executed at these lower temperatures due to the fluidity of the catalyst melt, contribute considerably to offset the apparent advantages of the more rapid isomerization rates obtained at higher temperatures.

The summation of the advantages possessed by the quaternary melts as isomerization catalysts is not possessed by any single one or any combination of two or three components of the melt. Thus aluminum chloride per se, or its combination with either sodium chloride or potassium chloride, is far too high melting to permit its use in the molten state for the isomerization of saturated hydrocarbons having at least five carbon atoms to the molecule. Certain ternary mixtures comprising aluminum chloride and two other of the components of the quaternary melt wherein the aluminum chloride is present in molecular excess have recently been found to possess appreciable activity as isomerization catalysts. Though certain of these ternary mixtures melt at sufficiently low temperatures to enable them to be used for the isomerization of pentane, they cannot be used at temperatures sufficiently low to avoid any substantial pentane decomposition. Furthermore, the relatively narrow temperature range between the minimum temperature at which these ternary mixtures can be maintained in the liquid phase and the maximum temperature at which they can be used for the isomerization of saturated hydrocarbons having at least five carbon atoms to the molecule is generally too small to assure complete freedom from the danger of freezing part of the catalyst within the system or two enable any substantial variation in catalyst composition.

The use of the lower melting quaternary mixtures permits substantial variations in catalyst composition without the danger of freezing part of the catalyst in the reaction zone, even at temperates sufficiently low to avoid any substantial decomposition of the more readily decomposed saturated hydrocarbons having at least five carbon atoms to the molecule, such as pentane. This increased range in permissible catalyst composition also permits the properties of the melt, such as its catalytic activity, to be modified to a greater degree. This is highly advantageous since it is often desirable to modify the activity of a catalyst melt in conformity with changes in operating conditions or changes in the hydrocarbon feed to the process.

Though the process of the invention can be applied with particular advantage to the treatment in the liquid phase at relatively low temperatures of saturated hydrocarbons having at least five carbon atoms to the molecule, it is to be understood that it is not limited thereto and may be advantageously employed at higher temperatures, for example, up to about 150° C., for the isomerization, preferably in the vapor phase, of the less readily degraded saturated hydrocarbons such as butane. These advantages comprise a greater degree of catalyst fluidity, assuring improved contact of reactants and catalyst, a far greater facility in the handling of the reaction mixture within the system, and a greater variation in permissible catalyst composition than is possible with the use of molten catalysts having higher melting points.

The suitability of the quaternary melts as catalysts for the isomerization of butane is shown by the following example wherein butane is treated at a temperature of only 100° C. and a contact time of 30 minutes.

Example II 340 grams of butane were treated with 247 grams of a quaternary catalyst melt having a composition in weight per cent of $AlCl_3$—75%, NaCl—7.5%, KCl—7.5%, $ZnCl_2$—10%. The operation was carried out at a temperature of 100° C., with a contact time of 30 minutes and a hydrogen chloride pressure of 200 pounds. A conversion of butane to isobutane of 23 mol per cent was obtained.

The process of the invention may be applied with particular advantage to the conversion of pentane to isopentane. However, as stated above, the invention may be applied advantageously to the isomerization of more stable paraffinic hydrocarbons such as, for example, butane. The invention is, however, not limited to the treatment of materials consisting essentially of a single hydrocarbon. Thus the process of the invention may be applied to the treatment of hydrocarbon mixtures comprising normal butane and/or normal pentane. For example, suitable starting materials are saturated hydrocarbon mixtures comprising, besides a substantial amount of normal butane and/or normal pentane, one or more other saturated hydrocarbons which may or may not be capable of isomerizing under the conditions of execution of the process. The invention thus provides a practical process for converting the normal butane and normal pentane contents of commercial saturated hydrocarbon fractions obtained from such sources as natural gas, products of thermal and catalytic hydrocarbon conversion operations, etc., to their branched chain isomers. Especially suitable mixtures of hydrocarbons are the so-called butane-butylene fractions and pentane-amylene fractions from which unsaturated hydrocarbons have been removed to at least a substantial degree. Treatment of the mixtures obtained, for instance as by-products in the sulfuric acid alkylation of isoparaffins, results in materially increasing their content of branched chain isomers and converting them to suitable raw materials for re-use in the alkylation process. The process of the invention is, however, in no wise limited to the treatment of normal butane and/or pentane or saturated hydrocarbon mixtures containing them. The process may be applied generally to the catalytic isomerization of any isomerizable non-olefinic hydrocarbon. Thus isomerizable saturated hydrocarbons having from four to ten carbon atoms may be treated in accordance with the process of the invention. While the process is particularly adapted to the isomerization of saturated open chain or paraffin hydrocarbons, it may be applied to the treatment of isomerizable naphthenic hydrocarbons such as, for example, methyl cyclopentane, dimethyl cyclopentane, methyl cyclohexane. Hydrocarbon fractions comprising substantial amounts of isomerizable saturated hydrocarbons such as, for example, fractions of straight run gasoline, casing head gasoline, etc., may be treated in accordance with the process of the invention to produce products suitable for alkylation with olefins and which have improved ignition characteristics.

The process of the invention may be executed at temperatures ranging from the minimum temperature at which the catalyst can be maintained in the liquid state up to about 150° C. When isomerizing pentane, temperatures not substantially in excess of about 80° C. are preferably used. When isomerizing butane, temperatures preferably not above 150° C. may be employed.

The process of the invention may be effected in the vapor or liquid phase. Hydrocarbons having at least five carbon atoms to the molecule, such as, for example, pentane, are preferably isomerized in the liquid phase, whereas butane may be isomerized in the vapor phase. When the isomerization is executed in the liquid phase, the pressure is of course, always sufficiently high to maintain at least a substantial portion of the hydrocarbon feed in the liquid phase. In vapor phase operation of the process, pressures ranging from about atmospheric up to about 250 pounds are usually most advantageously employed. Higher pressures may, however, be used.

The hydrocarbon or hydrocarbon mixtures treated are preferably substantially free of materials which undergo side reactions such as degradation, polymerization, etc., or which combine with components of the catalyst melt under the conditions of execution of the process. Olefins, diolefins, aromatic hydrocarbons or other detrimental impurities in the hydrocarbon or hydrocarbon mixture to be treated are preferably removed prior to isomerization by a suitable pretreatment which may comprise one or more of such steps as mineral acid refining, hydrogenation, alkylation, contact with clay or a part of the spent catalyst solvent extraction, etc.

Gases such as $H_2$, $N_2$, $CH_4$, $CO_2$, etc., may if desired be present in the reaction zone. When such gases are separately charged to the system, they may be preheated prior to their introduction into any part of the reaction zone to thereby aid in maintaining the reaction temperature.

The isomerization is preferably executed in the presence of a hydrogen halide promoter such as, for example, hydrogen chloride. This may be admixed with the hydrocarbon charge prior to its introduction into the reaction zone or may be passed in part or in its entirety separately into the reaction zone at one or a plurality of intermediate points thereof. The amount of hydrogen halide used may vary widely in accordance with operating conditions. In general, an amount of hydrogen chloride equal to from about 0.3% to about 10% of the hydrocarbon charge is found to be sufficient. Higher proportions of the hydrogen halide may, however, be used.

The process of the invention is carried out in a batch, intermittent or continuous manner. A suitable reaction zone enabling efficient contact of the liquid catalyst and the hydrocarbon charge may be used. The reaction zone may comprise, for example, one or a plurality of reaction chambers containing the catalyst melt. These reactors may be connected in parallel or in series and provided with suitable means for stirring the contents and maintaining the reaction temperature therein. If desired, the reaction zone may comprise an elongated reaction zone of restricted cross-sectional area, such as an externally heated coil positioned in a furnace structure, through which an admixture of hydrocarbon feed admixed with the catalyst melt may be passed. Effluence from the reaction zone may be passed to a suitable separating zone from which entrained catalyst may be separately withdrawn and returned to the reaction zone. Hydrogen halide and unconverted hydrocarbons are separated from the reaction products and may be recycled in part or in their entirety to the inlet or any intermediate part of the reaction zone. If desired, the effluence from the reaction zone may be directly combined with olefinic hydrocarbons and subjected to alkylating conditions to effect the alkylation of the branched chain hydrocarbons with olefinic hydrocarbons.

This application is a continuation-in-part of co-pending application Serial No. 416,754, filed October 27, 1941.

We claim as our invention:

1. A process for converting pentane to isopentane which comprises contacting pentane in the liquid phase with a molten quaternary mixture comprising aluminum chloride, sodium chloride, potassium chloride and zinc chloride in the weight ratio of about 75:7.5:7.5:10 respectively at a temperature not substantially in excess of about 80° C.

2. A process for converting normal or branched chain paraffin hydrocarbons having at least five carbon atoms to the molecule to branched or more highly branched chain paraffin hydrocarbons which comprises contacting the paraffin hydrocarbon in the liquid phase with a molten quaternary mixture comprising aluminum chloride, sodium chloride, potassium chloride and zinc chloride in the weight ratio of about 75:7.5:7.5:10 respectively at a temperature not substantially in excess of about 80° C.

3. A process for converting normal and branched chain isomerizable saturated hydrocarbons having at least five carbon atoms to the molecule to branched and more highly branched chain saturated hydrocarbons which comprises contacting the hydrocarbon in the liquid phase with a molten quaternary mixture comprising aluminum chloride, sodium chloride, potassium chloride and zinc chloride in the weight ratio of about 75:7.5:7.5:10 respectively at a temperature not substantially in excess of about 80° C.

4. A process for converting normal or branched chain paraffin hydrocarbons to branched and more highly branched chain paraffin hydrocarbons which comprises contacting the paraffin hydrocarbon under isomerizing conditions with a molten quaternary mixture comprising aluminum chloride, sodium chloride, potassium chloride and zinc chloride in the weight ratio of about 75:7.5:7.5:10 respectively.

5. A process for isomerizing saturated hydrocarbons which comprises contacting an isomerizable saturated hydrocarbon under isomerizing conditions with a molten quaternary mixture comprising aluminum chloride, sodium chloride, potassium chloride and zinc chloride in the weight ratio of about 75:7.5:7.5:10 respectively.

6. A process for isomerizing saturated hydrocarbons which comprises contacting a hydrocarbon fraction essentially comprising isomerizable saturated hydrocarbons under isomerizing conditions with a molten quaternary mixture comprising aluminum chloride, sodium chloride, potassium chloride and zinc chloride in the weight ratio of about 75:7.5:7.5:10 respectively.

7. A process for converting butane to isobutane which comprises contacting butane with a molten quaternary mixture comprising aluminum chloride, sodium chloride, potassium chloride and zinc chloride in the weight ratio of about 75:7.5:7.5:10 respectively at a temperature not substantially in excess of about 150° C.

8. A process for isomerizing saturated hydrocarbons which comprises contacting an isomerizable saturated hydrocarbon under isomerizing conditions with a molten quaternary mixture comprising aluminum chloride, sodium chloride, potassium chloride and zinc chloride, the aluminum chloride being present in molecular excess.

9. A process for isomerizing saturated hydrocarbons which comprises contacting an isomerizable saturated hydrocarbon in the presence of a promoting amount of a hydrogen halide under isomerizing conditions with a molten quaternary mixture comprising aluminum chloride, sodium chloride, potassium chloride and zinc chloride, the aluminum chloride being present in molecular excess.

HARRY A. CHENEY.
FRANK M. McMILLAN.